United States Patent
Obaidi

(10) Patent No.: US 10,701,551 B1
(45) Date of Patent: Jun. 30, 2020

(54) METHODS FOR SHARING A VIRTUAL SIM CARD

(71) Applicant: T-Mobile USA, Inc., Bellevue, WA (US)

(72) Inventor: Ahmad Arash Obaidi, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/567,453

(22) Filed: Sep. 11, 2019

(51) Int. Cl.
| | |
|---|---|
| *H04W 8/20* | (2009.01) |
| *H04W 4/50* | (2018.01) |
| *H04W 76/10* | (2018.01) |
| *H04W 4/80* | (2018.01) |

(52) U.S. Cl.
CPC .............. *H04W 8/205* (2013.01); *H04W 4/50* (2018.02); *H04W 4/80* (2018.02); *H04W 76/10* (2018.02)

(58) Field of Classification Search
CPC ......... H04W 8/205; H04W 4/50; H04W 4/80; H04W 76/10
USPC ....................................... 455/41.1–41.3, 558
See application file for complete search history.

(56) References Cited

U.S. PATENT DOCUMENTS 10,123,202 B1 * 11/2018 Polehn .................. H04W 8/183

FOREIGN PATENT DOCUMENTS

| CN | 104955022 | * | 9/2015 |
|---|---|---|---|
| CN | 104955022 A | | 9/2015 |
| CN | 103391535 B | | 2/2017 |
| KR | 101802264 | * | 11/2017 |
| KR | 101802264 B1 | | 11/2017 |
| WO | 2017016070 A1 | | 2/2017 |

* cited by examiner

*Primary Examiner* — Edward F Urban
*Assistant Examiner* — Angelica M Perez
(74) *Attorney, Agent, or Firm* — Troutman Sanders LLP; James E. Shutz; Robert R. Elliot, Jr.

(57) ABSTRACT

A method for virtual subscriber identity module (SIM) sharing. The method can include a service provider receiving a request including service details from a first UE. The service provider can verify the request and then generate a first SIM over-the-air (OTA) message. The first virtual SIM-OTA message can be sent to the first UE and causes the first UE to dynamically provision a virtual SIM. The service provider can also generate and transmit a first unique identifier to the first UE. The method can further include the service provider receiving a second unique identifier from a second UE. After determining the first unique identifier matches the second unique identifier, the service provider can generate and transmit a second SIM-OTA message to the second UE. The service provider can then provide the service to the first UE and second UE according to the service details.

19 Claims, 8 Drawing Sheets

METHODS FOR SHARING A VIRTUAL SIM CARD

FIELD

Examples of the present disclosure relate generally to dynamically provisioning a virtual subscriber identity module (SIM) card amongst multiple devices and, more particularly, to methods for sharing one or more services between multiple devices provided by the virtual SIM card.

BACKGROUND

Today, user equipment (UE) (e.g., smartphones, tablets, etc.) can use either a physical subscriber identity module (SIM) card or a virtual SIM, which can help a service provider identify the UE, store various data (e.g., contacts and/or photos), and allow the service provider to provide one or more services (e.g., text, talk, data, internet of things (IoT), etc.) to the UE. Presently, sharing a service between UEs requires a user to remove a physical SIM card from one UE and insert it in another UE. Once this is done, the user can receive the service on the other device. Unfortunately, sharing a physical SIM between multiple UEs requires the UEs to be in physical proximity of one another. Furthermore, with physical SIM cards, sharing a service can be limited to device types. Physical SIM cards can be incompatible between UEs, for example, and/or different device types (e.g., a vehicle vs. a UE) may not use the same type of physical SIM card.

These and other drawbacks exist. Accordingly, there is a need for a method of sharing a virtual SIM between multiple devices. More specifically, a need exists for dynamically provisioning the virtual SIM of multiple devices to enable sharing of a service.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Examples of the present disclosure relate generally to methods for sharing a virtual subscriber identity module (SIM) card. The method can include a plurality of user equipment (UEs), one or more other internet connected devices, and one or more service providers in communication. A user may wish to use different UEs for different services, for example, or to receive a service (e.g., voice calls) on different UEs at different times. The user may desire for a first UE to receive calls most of the time, for example, but for a second UE to receive calls between 8 PM and midnight. To accomplish this, the first UE can send a request to the service provider to allow sharing of the service with the second UE. The request can include service details, first device information for the first UE, second device information for the second UE, and the customer's information.

The service provider can then verify the request (e.g., customer information, first device information, and/or second device information) and then generate a first SIM over-the-air message (OTA). The first SIM-OTA can be sent to the first UE, which causes the first UE to generate a virtual SIM that can be used to receive the service (e.g., voice calls). Similarly, the service provider can generate a second SIM-OTA message and send it to the second UE, which causes the second UE to generate a virtual SIM that can also receive the service. As a result, the second UE can receive calls between 8 PM and midnight, while the first UE can receive calls between 12:01 AM and 7:59 PM.

Reference will now be made in detail to examples of the disclosed technology, examples of which are illustrated in the accompanying drawings and disclosed herein. Wherever convenient, the same reference numbers will be used throughout the drawings to refer to the same or like parts.

Figure 1:
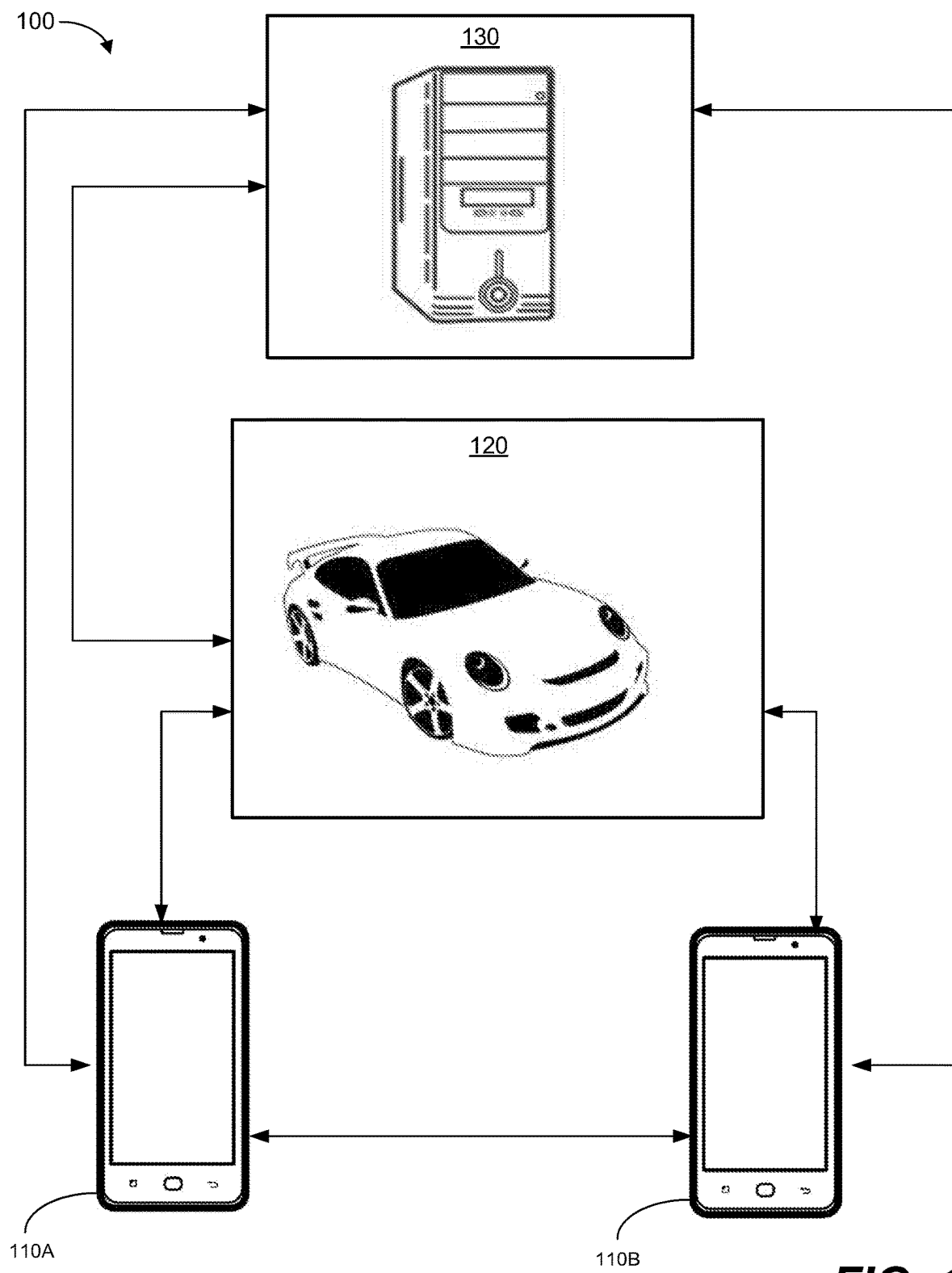
FIG. 1 is a diagram of an example of a system for virtual subscriber identity module (SIM) card sharing, in accordance with some examples of the present disclosure.

As shown in FIG. 1, an example of the present disclosure can comprise a system 100 for virtual SIM card sharing. The components and arrangements shown in FIG. 1 are not intended to limit the disclosed embodiments, as these components and features can vary. As shown in FIG. 1, in some implementations, the system 100 can include one or more UEs 110 (e.g., first UE 110A and second UE 110B). As non-limiting examples, the UEs 110 can be cell phones, smartphones, laptop computers, tablets, or other personal computing devices that include the ability to communicate on one more different types of networks. The system 100 can also be in communication with one or more cars 120, or other vehicles, equipped with the capabilities to receive data via the Internet and/or a cellular network. It should be noted that, while depicted as a vehicle in this example, the car 120 can be any of various devices configured to receive data over the Internet and/or a cellular network such as, for example, a refrigerator, smart television, smart watch, smart home hub (e.g., Amazon® Echo, Amazon Alexa®), or other device.

The system 100 can also include a service provider 130 for providing various communications services (e.g., talk, text, data, internet of things (IoT)). The service provider 130 can include one or more physical or logical devices (e.g., servers, cloud servers, etc.) or drives. Example computer architectures that can be used to implement the UEs 110, the car 120, and the service provider 130 are described below with reference to FIGS. 6, 7A, and 7B, respectively.

According to some examples, the UE 110 (e.g., first UE 110A) can communicate with another UE (e.g., second UE 110B), the car 120, and the service provider 130. For ease of explanation, as used herein, the first UE 110A can refer to the first device, or the device that is initiating the sharing of a virtual SIM, and the second UE 110B or the car 120 can refer to the second device, or the device receiving the requested service.

In some examples, to initiate service (e.g., text service) with a service provider, the first UE 110A can send a request to the service provider 130. The request can include first device information for the first UE 110A, second device information for a second device that will share the service (e.g., second UE 110B or car 120), one or more requested services (e.g., text, voice, and/or data service), service details, customer information, master device information, and/or the like. The service details can include, for example, a schedule of when a service should be shared, which devices to share the service, service limits (e.g., usage caps), etc. As the name implies, the master device information indicates which device operates as the master device, i.e., the device capable of changing the service details. In some examples, the device sending the request to share the service can be the master device by default, however, the master device information can specify for another device to be changed to the master device. The customer information can include the user's social security number, first and last name, address, permission to perform a credit check, payment information, account information, and other information typically used to establish or maintain an account with a service provider. Further, device information (e.g., first device information and/or second device information) can include an International Mobile Equipment Identity (IMEI), SIM identification (SIM ID), Universal Integrated Circuit Card (UICC) number, international mobile subscriber identity (IMSI), integrated circuit card identifier (ICCID), mobile subscription identification number (MSIN), etc. to enable the service provider 130 to identify the user and/or the device and to provision the device.

According to some examples, the service provider 130 can transmit the customer information to a credit bureau (e.g., Experian®, Transunion®, Equifax®). In response, the service provider 130 can receive the user's credit score from the credit bureau. In some examples, based at least in part on the user's credit score, the service provider 130 can determine whether the user is eligible for a service, to share services, or set limits on the user's account, among other things.

In some examples, the UEs 110 (e.g., first UE 110A and second UE 110B) and the car 120 can include sharing applications (apps) 612, 708, as discussed below with reference to FIGS. 6 and 7. The sharing apps 612, 708 can enable the devices to share information, for example, when the sharing app 612 is enabled on two devices (e.g., first UE 110A and second UE 110B). Thus, the first UE 110A can receive the second device information from the second UE 110B and can send first device information to the second UE 110B. This can be accomplished through near-field communication (NFC), Bluetooth® communication, Wi-Fi, cellular communication, or by other means known in the art.

After verifying the user and/or the first UE 110A, the service provider 130 can generate a first and second SIM OTA message based on the first and second device information, customer information, and/or the service details. The service provider 130 can then send the first SIM-OTA message to the first UE 110A and the second SIM-OTA message to the second device (e.g., second UE 110B or car 120) using the second device information. Further, the Mobile Country Code (MCC), Mobile Network Code (MNC), and Group ID (GID), and other information for the service provider 130 can be sent (either as part of the first and second SIM-OTA message or separately). The MCC, MNC, and GID can be required to provision a virtual SIM on the devices (e.g., first UE 110A, second UE 110B, and/or car 120). Indeed, the first SIM-OTA message can be used to configure the virtual SIM on the first UE 110A, such that the first UE 110A can receive the requested service(s) from the service provider 130. Of course, the second SIM-OTA message can be used to configure the virtual SIM on the second UE 110B or the car 120, such that the second UE 110B or the car 120 can receive the requested service from the service provider 130.

In some examples, the service provider 130 can use dual authentication to provision the second device (e.g., second UE 110B). In these examples, the service provider 130 can also generate a unique identifier, which can be transmitted to the first UE 110A. The unique identifier can be a string of unique characters, public/private key pairs, etc. The UEs 110 can include a provider app 614. Similarly, the car 120 can include a provider app 706. The provider app 706 and/or the provider app 614 can receive the unique identifier from the service provider 130, which can use provision app 712 to generate and transmit the unique identifier.

The service provider 130 can require a matching unique identifier from the second UE 110B before generating the second SIM-OTA. Therefore, a user of the first UE 110A can provide the unique identifier to the second UE 110B to facilitate sharing of the service. The second UE 110B can then send a copy of the unique identifier to the service provider 130 for verification (e.g., to verify that the copy of the unique identifier from the second UE 110B matches the unique identifier for the first UE 110A). After the service provider 130 determines a match, it can generate a second SIM-OTA based on the second device information, customer information, and/or the service details that can be transmitted to the second UE 110B. The second UE 110B can then use the second SIM-OTA to dynamically provision a virtual SIM to receive the service according to the service details.

The following describes how a device (e.g., first UE 110A, second UE 110B, and/or car 120) can be provisioned. In this example, the first UE 110A is used to describe how provisioning can occur, however, provisioning can occur the same, or similarly, on the second UE 110B and/or the car 120. Provisioning the first UE 110A can include the first UE 110A determining whether the first UE 110A already has the requested service (e.g., text messaging or a data package). When the first UE 110A has the service (i.e., there is an existing subscription for the same service), the first UE 110A can determine that a first virtual SIM is associated with the existing service, remove the existing service from the first virtual SIM, generate a second virtual SIM using the data in the SIM-OTA message, and assign the requested service to the second virtual SIM. Alternately, when the first UE 110A lacks the requested service, the first UE 110A can generate a first virtual SIM and based on the SIM-OTA message, and associate the requested service with the first virtual SIM.

According to some examples, a user (e.g., user of first UE 110A) can already have a particular service with the service provider 130, but wishes to share the service with another device (e.g., second UE 110B). To share the service with the second UE 110B, the first UE 110A can receive second device information from the second UE 110B and then transmit a request to share the service to the service provider 130. The request can include, for example, first device information, second device information, customer information, the service (including service details), master device information, etc. In response, the service provider can verify the request and then generate a first and second SIM-OTA message based at least in part on the first device and the second device information, respectively.

The service provider 130 can then transmit the first SIM-OTA message to the first UE 110A and the second SIM-OTA message to the second UE 110B. In this example, the first SIM-OTA can include instructions to update the existing service according to the service details. As a result, it may not be necessary to provision a virtual SIM or re-provision a virtual SIM on the first UE 110A—i.e., the first UE 110A can already have the service, so no modification is required. The second SIM-OTA message can cause the second UE 110B to dynamically provision a virtual SIM, such that the service can be received by the second UE 110B according to the service details.

Figure 2:
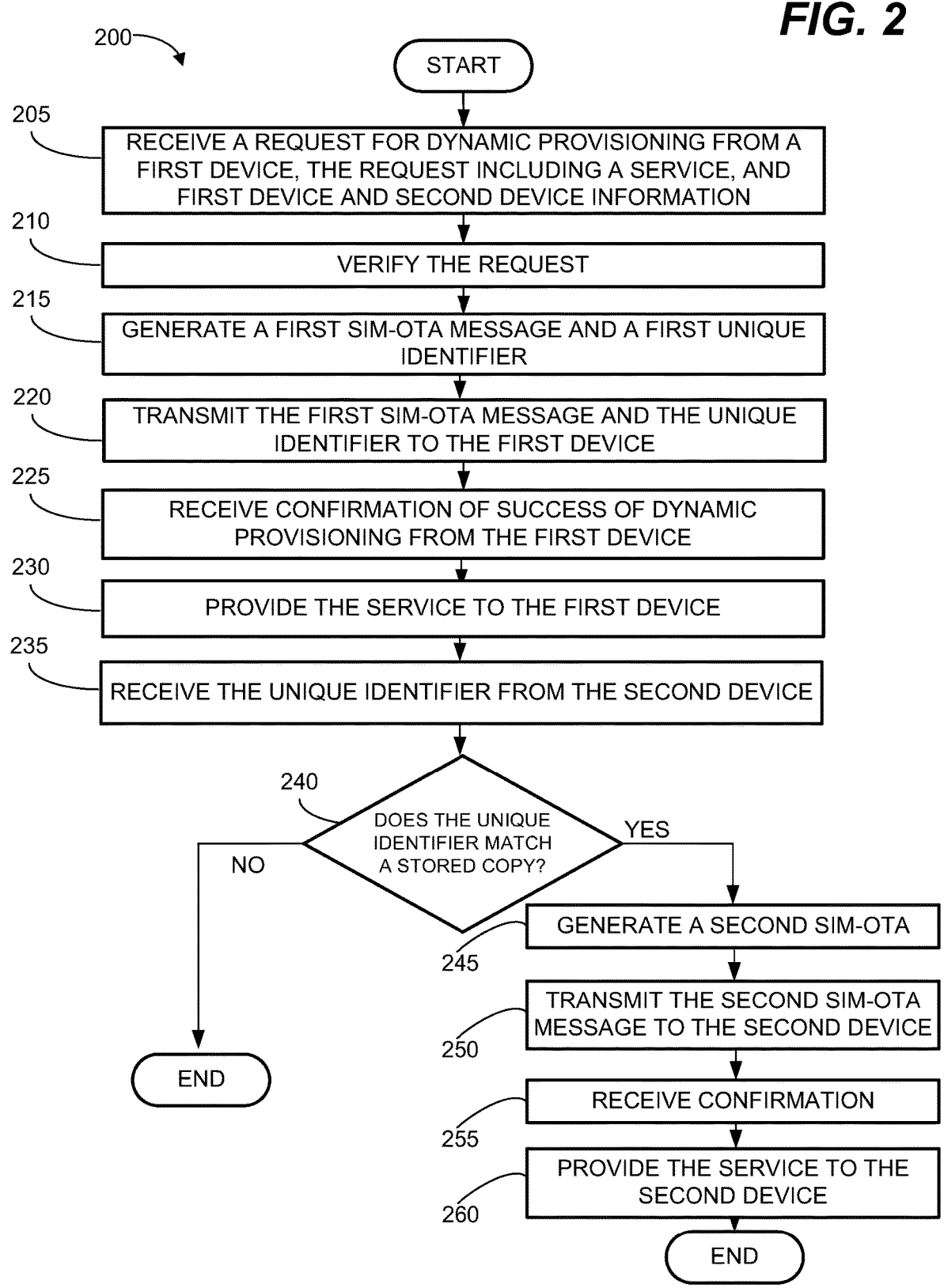
FIG. 2 is a flowchart depicting an example of a method for sharing a virtual SIM, requiring dual authentication, from the perspective of a service provider, in accordance with some examples of the present disclosure.

FIG. 2 illustrates a flowchart for an example of a method for sharing a virtual SIM, where the method uses dual authentication. The flowchart is written from the perspective of the service provider 130 in communication with the first UE 110A and the car 120. Here, dual authentication can require receipt of the second device information, and receipt of the unique identifier from the second device (e.g., car 120).

At 205, the service provider 130 can receive a request for dynamic provisioning from the first UE 110A. The user of the first UE 110A can send the request to establish service (e.g., voice) through the service provider 130. Further, the user can seek to share the service with another device (e.g., car 120). The request can include service details that indicate times and/or days when each device should receive the service. The user can drive to work Monday-Friday between 8:30 AM and 9:00 AM, for example; and thus, would prefer calls to be routed to the car 120, rather than the first UE 110A, during these times. In some examples the service details can also indicate which device can operate as the master device, i.e., the device capable of changing the service details. The master device can send a request to the service provider 130 that overrides the service details. For example, the service details can cause the first UE 110A to receive calls in the morning, however, in a scenario where the second UE 110B is the master device, the second UE 110B can transmit a request to receive calls one morning, which overrides the service details. The request can be sent through the provider app 614, for example, or as an email, text message, or even as a voice call to a call center of the service provider 130. The request can also include first device information for the first UE 110A, second device information for the car 120, and/or customer information for the user.

At 210, the service provider 130 can verify the request, which can involve communicating with a credit bureau to perform a background check, communicating with the user's financial institution to verify the user's payment information, verifying the first device information, etc. In examples where the user already has existing service with the service provider 130, the service provider 130 can verify the request by comparing the customer information to stored customer information, comparing the first device information to stored first device information, and/or verifying the services authorized for use by the first device.

At 215, The service provider 130 can generate a first SIM-OTA message based on the first device information, the customer information, and other relevant information. In some examples, the service provider 130 can also generate a unique identifier at 215. At 220, the service provider 130 can transmit the first SIM-OTA message and the unique identifier to the first UE 110A. As described below in reference to FIG. 4, the first SIM-OTA message can cause the first UE 110A to dynamically provision a virtual SIM that can be used to receive the service.

At 225, the service provider 130 can receive a confirmation of the dynamic provisioning from the first UE 110A. Similar to the request mentioned above, the confirmation can be transmitted via the provider app 614 or as an email, text message, or even as a voice call to a call center of the service provider 130. In response to receiving confirmation, at 230, the service provider 130 can provide the service to the first UE 110A according to the service details. At 235, the service provider 130 can receive the unique identifier from the car 120. The first UE 110A can transmit the unique identifier to the car 120 via the sharing app 612, or via email, text, etc. Furthermore, the user of the first UE 110A can communicate (e.g., verbally) the unique identifier to the user of the car 120, such that the user of the car 120 sends the unique identifier, for example, as an input in the provider app 706.

In some examples, the first UE 110A can only send first device information to the service provider 130. Therefore, in those examples, the car 120 can need to send the unique identifier and the second device information to the service provider 130 to receive the service according to the service details.

At 240, the service provider 130 can determine whether the unique identifier received from the car 120 matches the stored unique identifier. If the service provider 130 determines no match exists, then the method 200 can end. In some examples, the service provider 130 can send a message to the car 120 indicating the unique identifier does not match, and can provide the car 120 another opportunity to enter the unique identifier. If the service provider 130 determines a match exists, then at 245, the service provider 130 can generate a second SIM-OTA based on the second device information and/or the customer information.

At 250, the service provider 130 can transmit the second SIM-OTA message to the car 120. The service provider 130 can use second device information to determine an address to send the second SIM-OTA. With respect to the first SIM-OTA message mentioned above, the service provider 130 can similarly use the first device information to determine an address to send the first SIM-OTA. Similar to the first SIM-OTA message, the second SIM-OTA message can cause the car 120 to generate a virtual SIM that can receive the service according to the service details. At 255, the service provider 130 can receive confirmation that the virtual SIM has been successfully provisioned from the car 120. Of course, the confirmation can be transmitted via the provider app 706 or as an email, text message, or even as a voice call. At 260, the service provider 130 provides the service to the car 120 according to the service details.

Figure 3:
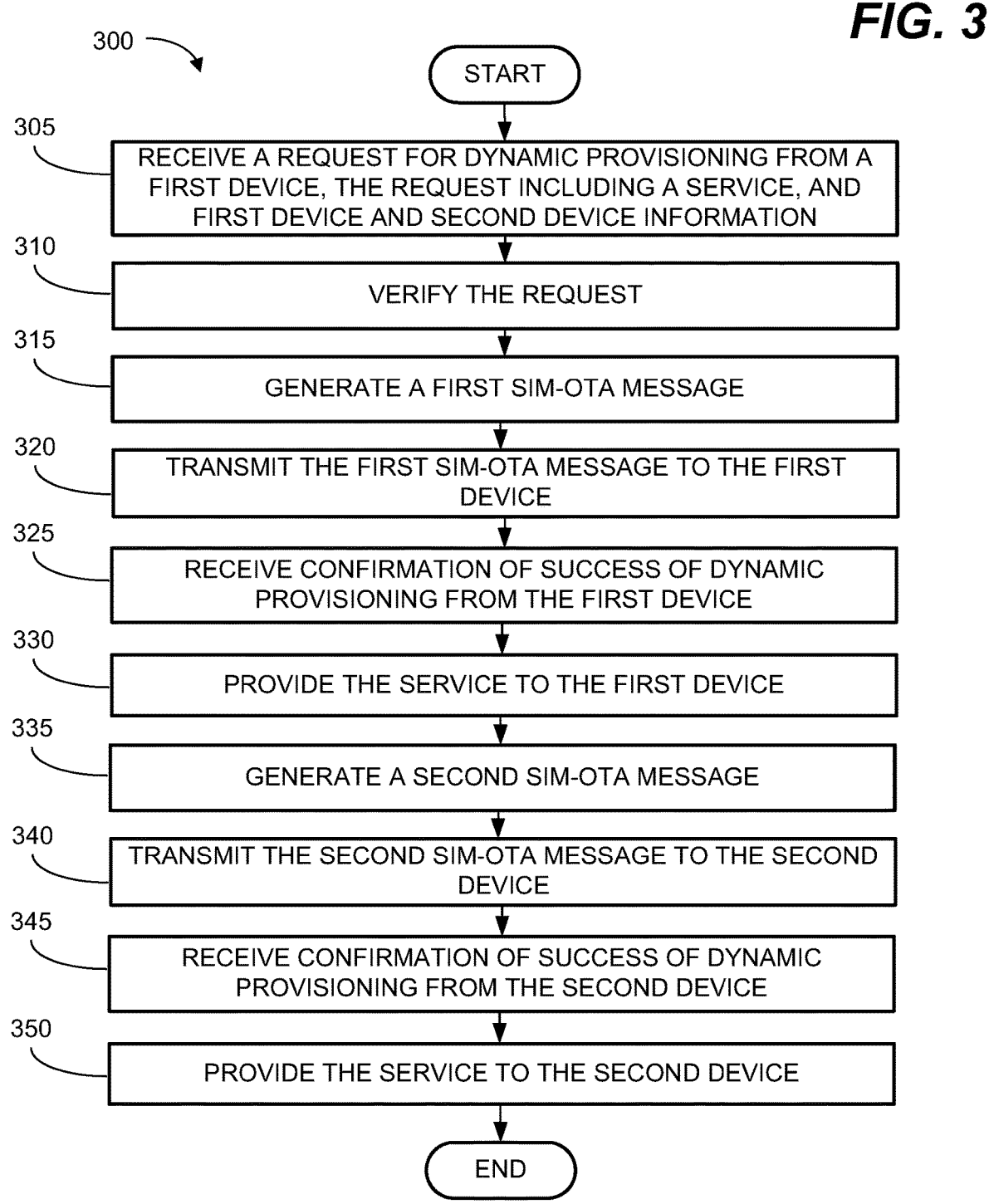
FIG. 3 is another flowchart depicting an example of a method for sharing a virtual SIM, requiring single authentication, from the perspective of a service provider, in accordance with some examples of the present disclosure.

FIG. 3 illustrates a flowchart for an example of a method for sharing a virtual SIM requiring single authentication. Similar to FIG. 2, the method 300 is written from the perspective of the service provider 130. The method 300 differs, however, from the method 200 in that only second device information is necessary to provide service to the second device (e.g., second UE 110B) according to the service details.

At 305, the service provider 130 can receive a request for dynamic provisioning from the first UE 110A. As mentioned above, the request can include service details, first device information, second device information, master device information (i.e., which, if any, device can change the service details), and/or customer information. Indeed, the request can be sent through the provider app 614, or in some examples, the first UE 110A can send the request as an email, text message, and/or as a voice call. Steps 310-330 can be substantially similar to steps 210-230 in FIG. 2, however, no unique identifier is involved in the method 300. Therefore, the method 300 can include the service provider 130 performing the following: verifying the request at 310; generating a first SIM-OTA message based on the first device information at 315; transmitting the first SIM-OTA message to the first UE 110A at 320; receiving confirmation of dynamic provisioning from the first UE 110A at 325; and providing the service to the first UE 110A at 330. Additionally, steps 335-350 can be substantially similar to steps 245-260 in FIG. 2. These steps can further include the following: generating a second SIM-OTA message based on the second device information at 335; transmitting the second SIM-OTA message to the second UE 110B at 340; receiving confirmation of dynamic provisioning from the second UE 110B at 345; and providing the service to the second UE 110B at 350.

Figure 4:
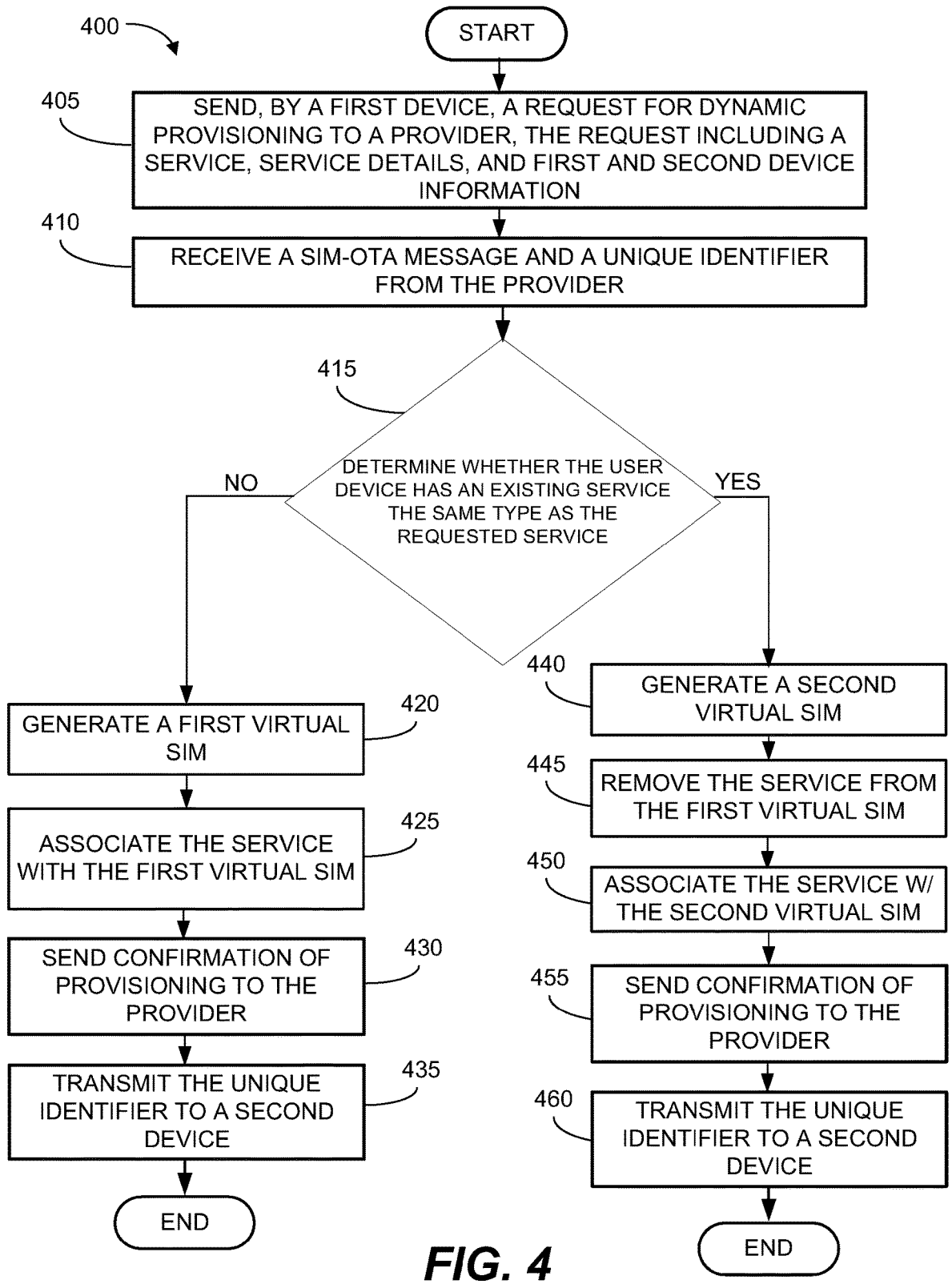
FIG. 4 is another flowchart depicting an example of a method for sharing a virtual SIM from the perspective of user equipment (UE), in accordance with some examples of the present disclosure.

FIG. 4 illustrates a flowchart depicting an example of a method for sharing a virtual SIM from the perspective of the UE 110. In the method 400, the user of the first UE 110A can wish to establish a service (e.g., texting) through the service provider 130. Furthermore, the user of the first UE 110A can desire to share the service with at least one other device (e.g., second UE 110B). Similar to method 200 shown in FIG. 2, the method 400 can use dual authentication to share the service with the second device (e.g., second UE 110B). Of course, single authentication, or other types of authentication could be used and are contemplated herein.

At 405, the first UE 110A can send a request for dynamic provisioning to the service provider 130 using, for example, the provider app 614 to transmit the request. Similar to methods 200 and 300, the request can include first device information, second device information, customer information, service details, and other relevant information. The first UE 110A can obtain second device information from the second UE 110B via a text message, internet connection, or other suitable means. The first UE 110A can obtain second device information from the second UE 110B when, for example, both devices are (1) using the sharing app 612, (2) brought within range of each other for NFC, and (3) a "sharing feature" is enabled on the sharing app 612 of one, or both, UE 110. The first UE 110A can also receive the second device information through Bluetooth®, WIFI, or any other means known in the art.

At 410, the first UE 110A can receive a SIM-OTA message and a unique identifier from the service provider 130. At 415, the first UE 110A can determine whether the first UE 110A has an existing service that is the same type as the requested service. If the first UE 110A determines the requested service does not exist on the first UE 110A, then at 420, the first UE 110A (e.g., a processor on the first UE 110A) can generate a new virtual SIM using the data from the SIM-OTA message. When received by the first UE 110A, the SIM-OTA message can cause the first UE 110A to create the virtual SIM (e.g., a trustlet or a small agent) within a secure element of the first UE 110A, such as the trusted execution environment (TEE). In examples where the new SIM credentials (e.g., MNC, MCC, and GID) are received separately from the SIM-OTA message, the secure element can store the new SIM credentials for later use to generate the virtual SIM. This process can be performed, for example, by an embedded SIM (e-SIM)—e.g., e-SIM 630, discussed below with reference to FIG. 6. The e-SIM can be located within the secure element or located within the normal operating system (OS) and communicate to the SIM-OTA platform via a secure channel. Further, the e-SIM can send a secure message to a processor of the first UE 110A to generate the virtual SIM and to associate the values of MNC, MCC, and GID. The e-SIM can also be responsible for switching between various virtual SIMs (e.g., virtual SIMs 632A-632*n*) to change services, communications channels, and/or antennas for the first UE 110A.

At 425, the first UE 110A can associate the service with the new virtual SIM. In some examples, the first UE 110A can include one antenna (e.g., antenna 634). In those examples, the e-SIM can communicate with the service provider 130 and determine the frequencies of communication (generally a frequency pair—one for uplink and one for downlink). The frequencies can vary by provider and/or by the type of service being used (e.g., talk, text, data, IoT) with each provider and/or service generally allocated a particular frequency spectrum. In this configuration, the eSIM, transceiver, or OS (via the processor), for example, can provide a multiplexing function to enable each virtual SIM to use the antenna (e.g., to send and receive data packets) at the appropriate frequency and at the appropriate time. In other words, each virtual SIM or each frequency can use the single antenna with "traffic control" provided by one or more components of the first UE 110A.

In some examples, the traffic control can be provided on a time divided basis. The time divided basis can use a first-in-first-out (FIFO) basis, for example, a time to transmit basis (i.e., smaller packets go before larger packets, or vice-versa), a latency basis (i.e., packets for networks with higher or lower latency go first), or any other suitable time-based scheme. In other examples, the traffic control can be provided on a priority basis. In other words, packets associated with services that require low latency (e.g., voice calls or streaming) can be sent and received before, for example, packets associated with services that can tolerate higher latency (e.g., text messaging or e-mail).

In other examples, each virtual SIM can be associated with a separate antenna; for example, virtual SIM A (e.g., virtual SIM 632A) can be associated with antenna A (e.g., antenna 534A), and virtual SIM B can be associated with antenna B, etc. In those examples, the SIM-OTA can instruct the processor, for example, to assign each virtual SIM to a particular antenna. The SIM-OTA message can also include the appropriate frequency (or frequency pair), provider information (e.g., the MCC, MNC, GID, etc.), and other data to enable the virtual SIM to communicate on the appropriate frequency and with the appropriate provider.

In those examples, the e-SIM, transceiver, or processor, for example, can determine and route communications to and from the appropriate virtual SIM. The appropriate virtual SIM can be chosen based on the type of service (e.g., 2G, 3G, 4G, or 5G), the provider, or the priority. So, for example, autonomous driving functions—which require very low latency—can be assigned to a first virtual SIM on a 5G network and the virtual SIM can be given high priority when sending and receiving data. Text messaging, on the other hand, which can tolerate relatively high latency, can be assigned to a second virtual SIM on a 3G (legacy) network and be given low priority when sending and receiving data. In some examples, user preferences can determine the appropriate virtual SIM—e.g., the user has exclusively designated a particular service provider for a particular service.

At 430, after successfully provisioning the first virtual SIM, the first UE 110A can send confirmation of the provisioning to service provider 130. Once the first virtual SIM is provisioned, the first UE 110A can receive the service from the service provider 130. At 435, to facilitate sharing of the service with the second UE 110B, the first UE 110A can transmit the unique identifier to the second UE 110B. Once the second UE 110B successfully transmits the unique identifier to the service provider 130, the second UE 110B can receive the second SIM-OTA message from the service provider 130, which can cause the second UE 110B to dynamically provision a virtual SIM.

If, at 415, the first UE 110A determines the service already exists, on the other hand, then at 440, the first UE 110A can generate a second virtual SIM. At 445, the first UE 110A can then remove the service from the first virtual SIM. At 450, the first UE 110A can associate the service with the second virtual SIM. At 455, the first UE 110A can then send a confirmation of the dynamic provisioning to the service provider 130. At 460, for security, the first UE 110A can then transmit the unique identifier to the second UE 110B.

In some examples, rather than deleting an existing virtual SIM, the existing virtual SIM can be re-provisioned. When the virtual SIM is re-provisioned, certain associated data (e.g., provider name, communication frequency, MNC, MCC, and GID) can be removed from the virtual SIM and replaced with new data corresponding to the new provider and/or type of service. So, for example, rather than deleting the first virtual SIM, above, it can be possible to merely change the service details (e.g., to add or remove a service).

Figure 5:
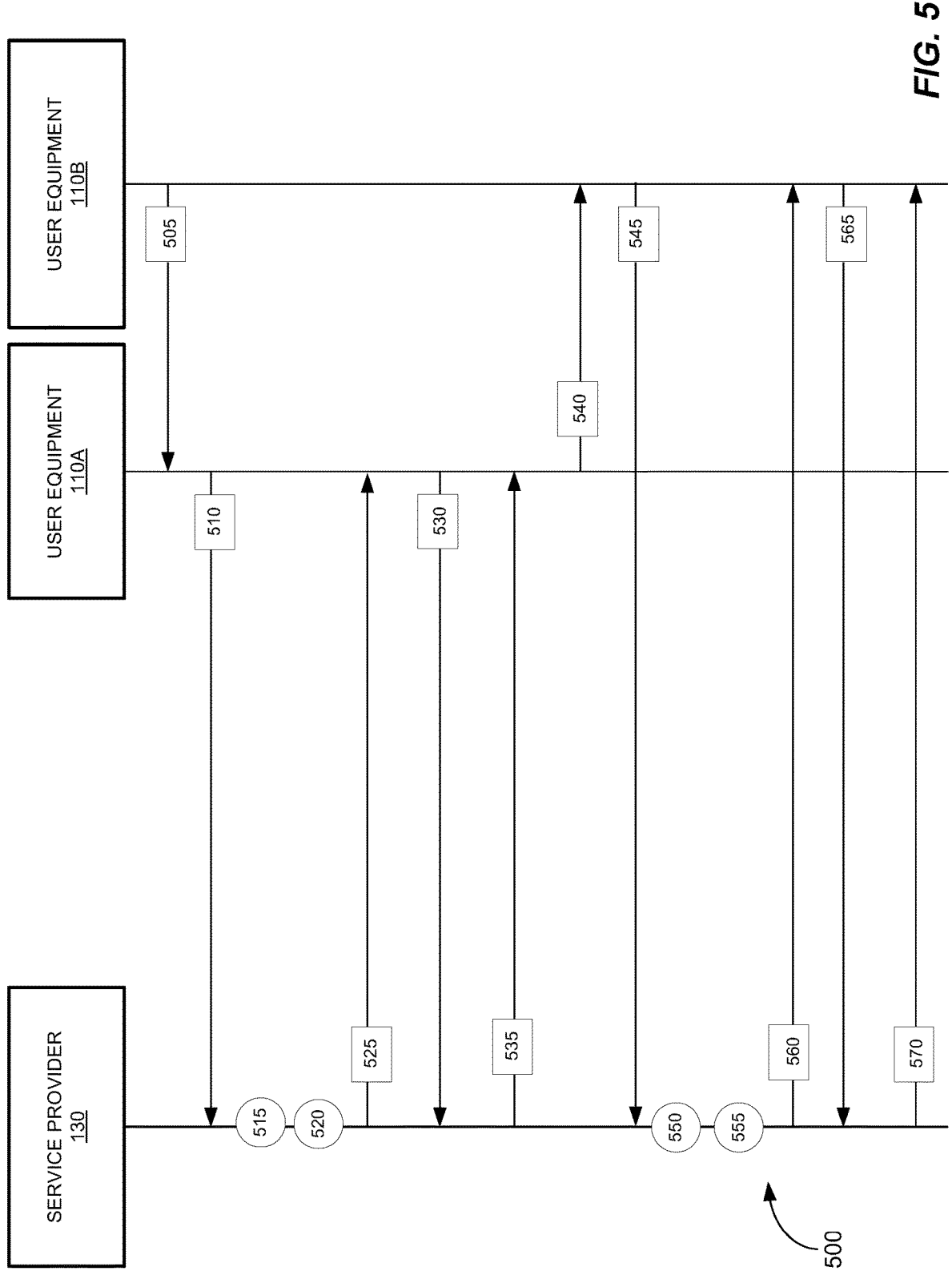
FIG. 5 is a timing diagram depicting an example of a method where a service provider dynamically provisions two UEs to share a virtual SIM, in accordance with some examples of the present disclosure.

FIG. 5 illustrates a timing diagram depicting an example of a method 500 where a service provider dynamically provisions two UEs 110 (e.g., first UE 110A and second UE 110B) to share a service. The method 500 also uses dual authentication to provide the shared service with the second device (second UE 110B).

At 505, the second UE 110B can send the second device information to the first UE 110A. As mentioned above, in some examples, the second UE 110B can use the sharing app 612 to send the second device information to the first UE 110A. At 510, the first UE 110A can send a request for dynamic provisioning to the service provider 130. The request can include a service (e.g., text messaging), first device information for the first UE 110A, second device information for the second UE 110B, service details, master device information, and/or customer information.

At 515, the service provider 130 can verify the request, for example, by confirming with a financial institution that the payment information belongs to the customer name listed in the customer information. The service provider 130 can further verify the request by determining whether the first device information and/or the second device information has a predetermined number of characters, contains only valid characters, etc.

At 520, the service provider 130 can generate a first SIM-OTA based on, for example, the first device information and/or the customer information. The service provider 130 can also generate a unique identifier, which can be used to authenticate the request for a shared service. At 525, the service provider 130 can transmit the first SIM-OTA message and the unique identifier to the first UE 110A using the first device information (e.g., to determine an address or phone number for the first UE 110A). The first SIM-OTA message can cause the first UE 110A to generate, or provision, a virtual SIM and to associate the service with the virtual SIM. At 530, the first UE 110A can send a confirmation message to the service provider 130 indicating the virtual SIM has been successfully provisioned. At 535, the service provider 130 can provide the requested service to the first UE 110A according to the service details.

At 540, the first UE 110A can transmit the unique identifier to the second UE 110B. As previously mentioned, the first UE 110A and second UE 110B can communicate via the sharing app 612 (e.g., via a WiFi or Bluetooth® connection). At 545, to receive the shared service, the second UE 110B can transmit the unique identifier to the service provider 130. At 550, the service provider 130 can compare the unique identifier received from the second UE 110B to a stored unique identifier. At 555, when a match is determined, the service provider 130 can generate a second SIM-OTA message based on the second device information and/or the customer information. In some examples, when a match is not found, the service provider 130 can send a message to the second UE 110B indicating the unique identifier does not match the stored unique identifier, and can provide the second UE 110B another opportunity to enter a matching unique identifier or can cancel the provisioning for one, or both, UE 110. At 560, the service provider 130 can transmit the second SIM-OTA message to the second UE 110B. The second SIM-OTA message can cause the second UE 110B to be dynamically provisioned, i.e., generating a virtual SIM to receive the shared service. At 565, the second UE 110B can transmit a message to the service provider 130 indicating the second UE 110B has been successfully provisioned. Finally, at 570, the service provider 130 can provide the shared service according to the service details to the second UE 110B.

Figure 6:
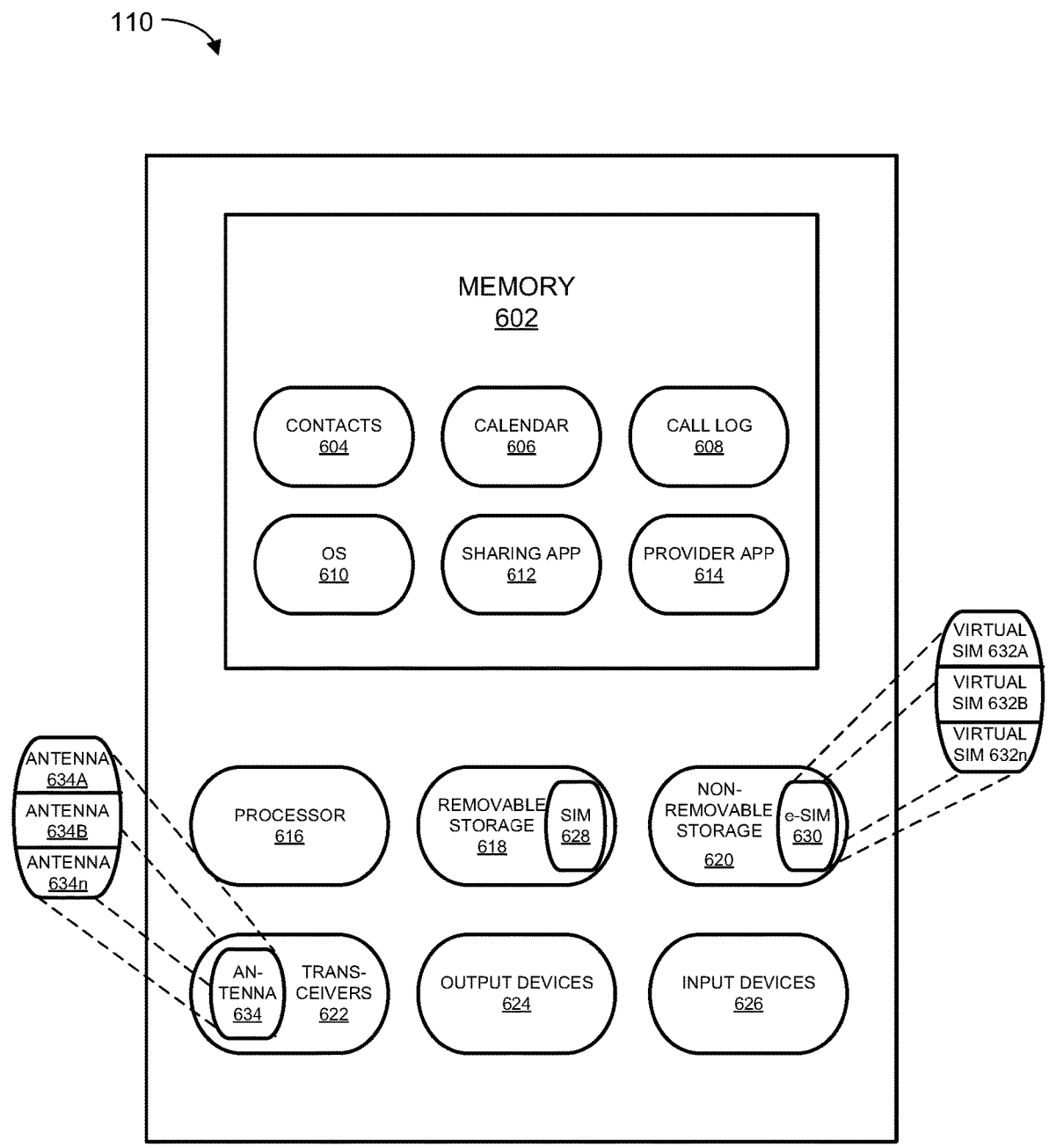
FIG. 6 is an example of a UE for use with the systems and methods disclosed herein, in accordance with some examples of the present disclosure.

As shown in FIG. 6, some, or all, of the system 100 and methods 200, 300, 400, 500 can be performed by, and/or in conjunction with, the UE 110 (e.g., first UE 110A and/or second UE 110B). For clarity, the UE 110 is described herein generally as a cell phone or smart phone. One of skill in the art will recognize, however, that the system 100 and methods 200, 300, 400, 500 can also be used with a variety of other electronic devices, such as, for example, tablet computers, laptops, desktops, and other network (e.g., cellular or internet protocol (IP) network) connected devices from which a call can be placed, a text can be sent, and/or data can be received. These devices are referred to collectively herein as the UE 110. The UE 110 can comprise a number of components to execute the above-mentioned functions and apps. As discussed below, the UE 110 can comprise memory 602 including many common features such as, for example, contacts 604, a calendar 606, a call log (or, call history) 608, and OS 610. In this case, the memory 602 can also store a sharing app 612 and a provider app 614.

The UE 110 can also comprise one or more processors 616. In some implementations, the processor(s) 616 can be a central processing unit (CPU), a graphics processing unit (GPU), or both CPU and GPU, or any other sort of processing unit. The UE 110 can also include one or more of removable storage 618, non-removable storage 620, one or more transceiver(s) 622, output device(s) 624, and input device(s) 626. In some examples, the UE 110 can also include a physical SIM 628 and/or an e-SIM 630 including an International Mobile Subscriber Identity (IMSI) and other relevant information.

In various implementations, the memory 602 can be volatile (such as random-access memory (RAM)), non-volatile (such as read only memory (ROM), flash memory, etc.), or some combination of the two. The memory 602 can include all, or part, of the functions 604, 606, 608, 612, 614 and the OS 610 for the UE 110, among other things.

The memory 602 can also comprise contacts 604, which can include names, numbers, addresses, and other information about the user's business and personal acquaintances, among other things. In some examples, the memory 602 can also include a calendar 606, or other software, to enable the user to track appointments and calls, schedule meetings, and provide similar functions. In some examples, the memory 602 can also comprise the call log 608 of calls received, missed, and placed from the UE 110. As usual, the call log 608 can include timestamps for each call for use by the system 100. Of course, the memory 602 can also include other software such as, for example, e-mail, text messaging, social media, and utilities (e.g., calculators, clocks, compasses, etc.).

The memory 602 can also include the OS 610. Of course, the OS 610 varies depending on the manufacturer of the UE 110 and currently comprises, for example, iOS 12.1.4 for Apple products and Pie for Android products. The OS 610 contains the modules and software that supports a computer's basic functions, such as scheduling tasks, executing applications, and controlling peripherals.

As mentioned above, the UE 110 can also include the sharing app 612. The sharing app 612 can perform some, or all, of the functions discussed above with respect to the methods 200, 300, 400, 500 for interactions occurring between the service provider 130, the first UE 110A, the second UE 110B, and/or the car 120. Thus, the sharing app 612 can receive the device information and/or the unique identifier, transmit the device information and/or the unique identifier to the service provider 130 and/or between the UE 110. The sharing app 612 can also receive messages from the service provider 130 indicating whether the unique identifier matches the stored copy, among other things.

From a practical standpoint, the user of the first UE 110A can open the sharing app 612 by pressing an icon on a touchscreen of the first UE 110A representing the sharing app 612. Once opened, the sharing app 612 can display as a graphical user interface (GUI), for example, including several options as buttons, radio boxes, and/or text input boxes. The GUI can enable the user to enter information related to what services and devices to share/receive (e.g., device information, unique identifier, etc.), who to share/receive it with/from (e.g., other devices within a network, a specific device name, phone number, etc.), and/or how to share the data (e.g., Bluetooth®, NFC, Wi-Fi, etc.). Further, the sharing app 612 can include notifications alerting the user that another device would like to acquire its device information, and can ask for user permission to share the device information. The user of the second UE 110B can similarly select the sharing app 612 on the second UE 110B and select one or more of the aforementioned options. In examples where the data is shared via NFC, the first UE 110A and the second UE 110B can be brought with an NFC range to transmit and receive data.

So, for example, the user of the first UE 110A can open the sharing app 612 and select "share." The GUI can then prompt the user to enter (1) what services to share (e.g., voice and text) (2) who to share it with (e.g., phone number 404-555-1212 for the second UE 110B) and how to communicate with the second UE 110B (e.g., NFC). The users can then place the first UE 110A and the second UE 110B within a predetermined distance (e.g., three feet) and select "connect." The first UE 110A can then receive the information from the second UE 110B (e.g., UCCID, SIM ID, etc.) needed to provision the second UE 110B on the network. The user of the first UE 110A can then select "send" to send the request to the service provider 130 including device information for the first UE 110A and second UE 110B, customer information, account information, and other information to enable the service provider 130 to provisional virtual SIMS and share the requested services (e.g., voice and text) on the first UE 110A and the second UE 110B.

The UE 110 can also include the provider app 614. The provider app 614 can work facilitate communication between the UE 110 and the service provider 130. The provider app 614 can receive, for example, the SIM-OTA message from the service provider 130 and can also configure the e-SIM 630 using the configurations provided in the SIM-OTA message. The e-SIM 630 can use the SIM-OTA message to generate a first virtual SIM 632A and associate the requested service with the first virtual SIM 632A and the service provider 130. In some examples, the requested service can be replacing an existing service, but switching to a new service provider 130, or replacing an existing service with a different package (e.g., the same service provider 130 came out with a new deal for the same service(s)). In those examples, if the existing service is associated with the first virtual SIM 632A, the e-SIM 630 can remove the existing service from the first virtual SIM 632A and generate a second virtual SIM 632B. Further, the e-SIM 630 can associate the requested service with the second virtual SIM 632B.

The provider app 614 can also be accessed by the user pressing an icon on the touchscreen of UE 110 and/or the car 120 that represents the provider app 614. The provider app 614 can display various options as a graphic user interface, for example, an option to send a request for sharing a service, which may include fields to input data as part of the request (e.g., customer information, first device information, master device information, etc.). The SIM-OTA message and/or the unique identifier can be received by the provider app 614. Prior to receiving either, the provider app 614 can generate an alert seeking user permission to receive the SIM-OTA message or the unique identifier. Of course, the provider app 614 can communicate with the processor to determine the result of the provisioning. In some examples, after receiving the SIM-OTA message, the provider app 614 can generate and output a message indicating successful or unsuccessful provisioning of the device.

The UE 110 can also include additional data storage devices (removable and/or non-removable) such as, for example, magnetic disks, optical disks, or tape. Such additional storage is illustrated in FIG. 6 by removable storage 618 and non-removable storage 620. The removable storage 618 and non-removable storage 620 can store some, or all, of the functions 604, 606, 608, 612, 614 and the OS 610.

Non-transitory computer-readable media can include volatile and nonvolatile, removable and non-removable tangible, physical media implemented in technology for storage of information, such as computer readable instructions, data structures, program modules, or other data. The memory 602, removable storage 618, and non-removable storage 620 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UE 110. Any such non-transitory computer-readable media can be part of the UE 110 or can be a separate database, databank, remote server, or cloud-based server.

In some implementations, the transceiver(s) 622 include any sort of transceivers known in the art. In some examples, the transceiver(s) 622 can include wireless modem(s) to facilitate wireless connectivity with the other UEs, the Internet, and/or an intranet via a cellular connection. Further, the transceiver(s) 622 can include a radio transceiver that performs the function of transmitting and receiving radio frequency communications via antenna 634 (e.g., Wi-Fi or Bluetooth®).

In some examples, the transceiver(s) 622 can include a plurality of antennas 634A-n. Each of the plurality of antennas 634A-n can correspond to a respective virtual SIM 632 and a designated communication frequency or frequency pair. This can enable each virtual SIM 632 to use a dedicated antenna for communications, obviating the need for traffic controls, multiplexing, etc. The communication frequency can be specific to the service provider 130 and/or to the type of service (e.g., talk, text, or IoT) associated with the respective virtual SIM 632, for example, the virtual SIM 632 can be programmed by the SIM-OTA message to communicate at a designated frequency for text services. Additionally, the communication frequency can be, at least in part, based on the type of service (e.g., 2G, 3G, 4G, or 5G) used by the respective virtual SIM 632. Therefore, the virtual SIM 632 can communicate at a variety of frequencies based on the available type of service. In other words, different portions of the communications spectrum are dedicated to 3G communication rather than, for example, 4G long-term evolution (LTE) communications. Furthermore, the e-SIM 630 can determine the type of communication (e.g., text or talk), the available frequencies, the available providers, etc. and route communications to the appropriate virtual SIM 632.

In some examples, UE 110 can include only one antenna (e.g., antenna 634) that provides communications for all of the virtual SIMs 632A-n. In those examples, the e-SIM 630 can identify the service provider 130, the type of service, and/or the quality service and determine an appropriate communication frequency. Next, the e-SIM 630 can communicate the appropriate frequency to the respective virtual SIM 632. The e-SIM 630 can determine the appropriate virtual SIM 632 based on the service provider 130, type of service, and/or quality of service to the corresponding values assigned to the virtual SIM 632.

In this configuration, the e-SIM 630, transceiver(s) 622, OS 610, or other component of the UE 110, can act as "traffic cop" to prevent interference between the various virtual SIMs 632. In other words, as packets are sent and received for voice and text messages occurring contemporaneously on the UE 110—i.e., the user is texting and talking on the phone at the same time—the transceiver 622, for example, can switch back and forth between the appropriate frequencies on the antenna to effect both types of communications. This can be done on a time basis (e.g., first-in-first-out), a priority basis (e.g., voice takes precedence over text), or any other suitable method. This can enable the UE 110 to use multiple virtual SIMs 632 on multiple frequencies with multiple providers, for example, at the same time.

In other examples, the transceiver(s) 622 can include wired communication components, such as a wired modem or Ethernet port, for communicating with the other UE or the provider's Internet-based network. In this case, the transceiver(s) 622 can also enable the UE 110 to communicate with the car 120 and the service provider 130, as described herein.

In some implementations, the output device(s) 624 include any sort of output devices known in the art, such as a display (e.g., a liquid crystal or thin-film transistor (TFT) display), a touchscreen display, speakers, a vibrating mechanism, or a tactile feedback mechanism. In some examples, the output device(s) 624 can play various sounds based on, for example, whether the UE 110 is connected to a network, the type of call being received (e.g., video calls vs. voice calls), the number of active calls, etc. In some examples, the output device(s) can play a sound when a new service listing is requested, a match is found for a request, a new SIM-OTA message is received, etc. Output device(s) 624 can also include ports for one or more peripheral devices, such as headphones, peripheral speakers, or a peripheral display.

In various implementations, input device(s) 626 include any sort of input devices known in the art. The input device(s) 626 can include, for example, a camera, a microphone, a keyboard/keypad, or a touch-sensitive display. A keyboard/keypad can be a standard push button alphanumeric, multi-key keyboard (such as a conventional QWERTY keyboard), virtual controls on a touchscreen, or one or more other types of keys or buttons, and can also include a joystick, wheel, and/or designated navigation buttons, or the like.

The UE 110 can also include a physical SIM 628. The physical SIM 628 can comprise a removable card that includes UE data, user data, provider data, etc. In some examples, the physical SIM 628 can be linked to the service provider 130, for example, or another service provider from which the UE 110 was originally obtained, among other things. The physical SIM 628 can be used to establish an initial connection with a network, for example, to enable the UE 110 to access the service provider 130.

The e-SIM 630 can also include one or more virtual SIMs 632 (e.g., virtual SIMs 632A-632n). The virtual SIMs 632, in conjunction with the service provider 130 or other service providers, can enable the user to dynamically change the services, service details, service providers, etc. on the UE 110. Indeed, the virtual SIMs 632 can also enable the UE 110 to access different services using different service providers at the same time. When a service is changed on the UE 110, new virtual SIMs 632 can be added and provisioned and/or existing virtual SIMs 632 can be re-provisioned or deleted.

Figure 7A:
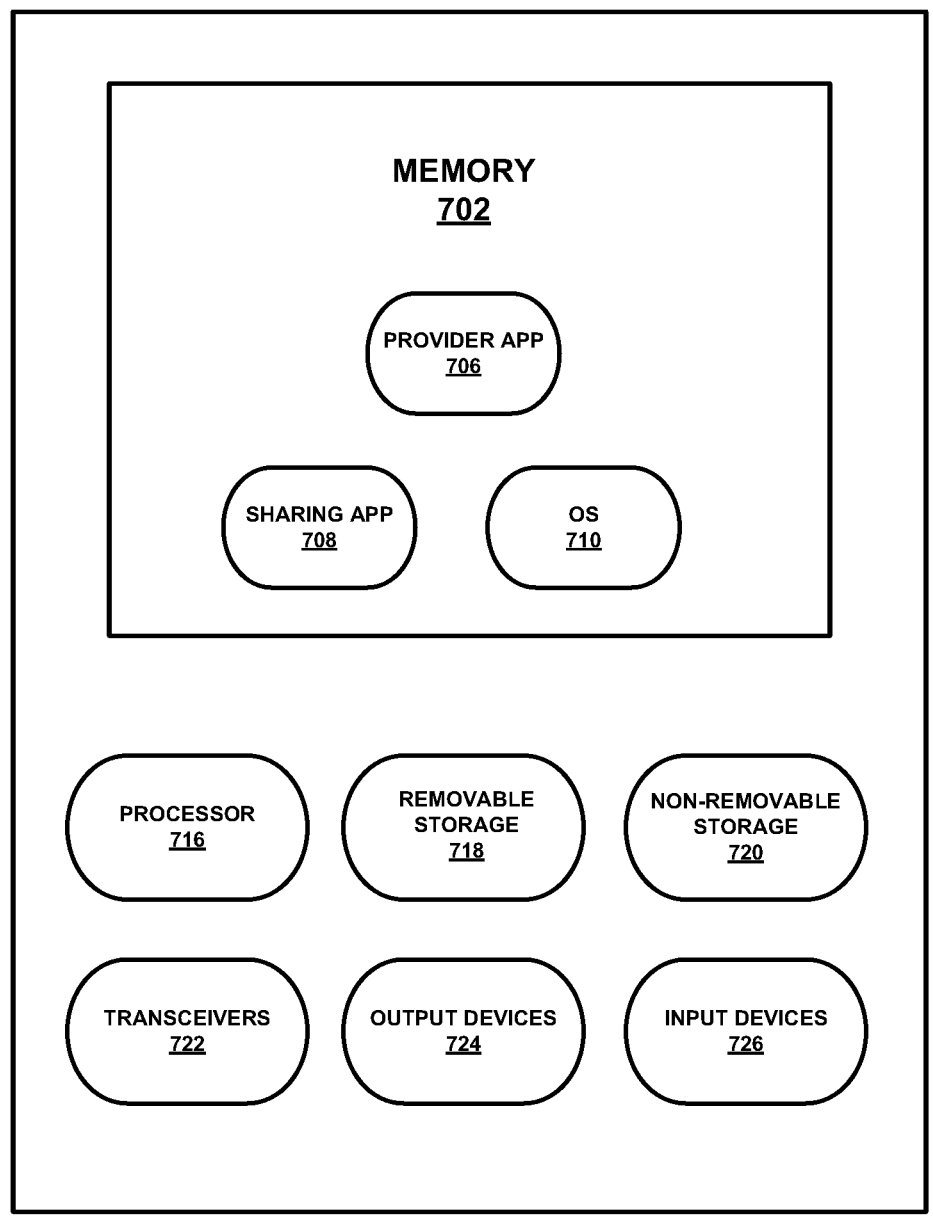
FIGS. 7A-B are examples of an internet connected device and a service provider server, respectively, in accordance with some examples of the present disclosure.
Figure 7B:
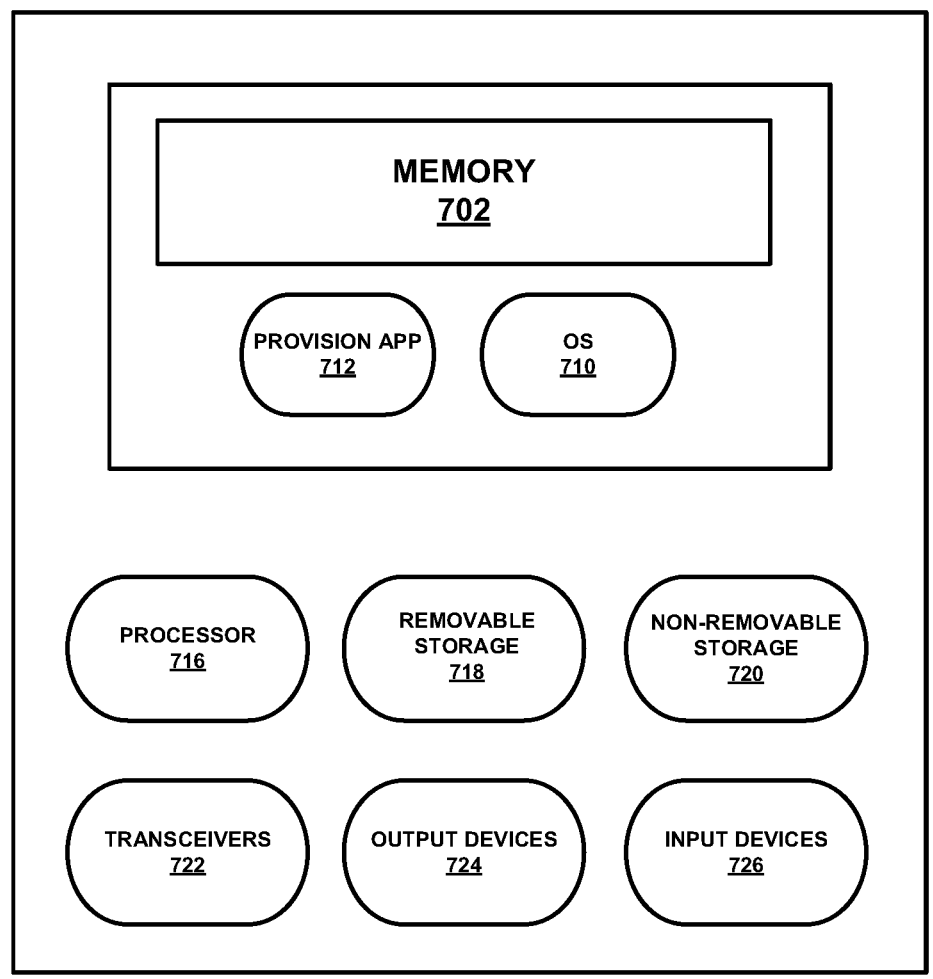

As shown in FIGS. 7A-B, the system 100 and methods 200, 300, 400, 500 can also be used in conjunction with a car server 700A and a service provider server 700B. The servers 700 can comprise, for example, a desktop or laptop computer, a server, bank of servers, or cloud-based server bank. Thus, while the servers 700 are depicted as single standalone servers, other configurations or existing components could be used. In some examples, the servers 700 can comprise existing network entities such as, for example, a home location register (HLR), home subscriber service (HSS), a third-generation partnership project authentication, authorization and accounting (3GPP AAA) server, or another server or component.

The servers 700 can be substantially similar and can perform many of the same functions. The servers 700 can comprise a number of components to execute the above-mentioned functions and apps. As discussed below, the servers 700 can comprise memory 702 including many common features such as, for example, the OS 710.

In various implementations, the memory 702 can be volatile (such as random-access memory (RAM)), non-volatile (such as read only memory (ROM), flash memory, etc.), or some combination of the two. The memory 702 can include all, or part, of the functions of a provider app 706 and a sharing app 708 on the car server 700A, among other things. Similarly, on the service provider server 700B, the memory 702 can include all, or part, of the functions of the provider app 706, among other things.

The memory 702 can also include the OS 710. Of course, the OS 710 varies depending on the manufacturer of the server 700 and the type of component. Many servers, for example, run Linux or Windows Server. Dedicated cellular routing servers can run specific telecommunications OS 710. The OS 710 contains the modules and software that supports a computer's basic functions, such as scheduling tasks, executing applications, and controlling peripherals.

As shown in FIG. 7A, the car server 700A can incorporate the car 120. The provider app 706 can be substantially similar to the provider app 614 mentioned above. Therefore, the provider app 706 can be accessed via the touchscreen of the car 120, and can include a graphical user interface. To this end, the provider app 706 can provide communication between the car server 700A and the service provider 130. Thus, the provider app 706 can transmit device information to the service provider 130. Of course, the device information can be its own device information and/or device information of one or more UEs. The provider app 706 can also receive the unique identifier from the service provider 130.

The sharing app 708 can provide communication between the car 120 and the UEs 110. For example, the sharing app 708 can request and receive device information from the UE 110. The sharing app 708 can also request and receive the unique identifier from the UE 110. Similarly, the sharing app 708 can receive a request for device information and/or the unique identifier from the UE 110. In response, the sharing app 708 can transmit the device information and/or the unique identifier to the UE 110.

As shown in FIG. 7B, the service provider 130 can have one or more service provider servers 700B for communicating with the UEs 110, and/or the car 120. The service provider server 700B can also include the provision app 712, which can provide communication between the service provider 130 and the UEs 110 and/or the car 120. The provision app 712 can receive the request to share a service from UEs 110 or the car 120. Also, the provision app 712 can transmit the SIM-OTA messages to the UEs 110 or the car 120 after the request from one of the UEs 110 and/or or the car 120 is received. In some examples, the provision app 712 can be used to verify the request, for example, the provision app 712 can verify the request after determining a match by comparing stored data to data received within the request. Further, the provision app 712 can transmit the unique identifier to one of the UEs 110 and/or or the car 120.

Both servers 700 can also include additional data storage devices (removable and/or non-removable) such as, for example, magnetic disks, optical disks, or tape. Such additional storage is illustrated in FIGS. 7A and 7B by removable storage 718 and non-removable storage 720. The removable storage 718 and non-removable storage 720 can store some, or all, of the OS 710 and functions 706, 708.

Non-transitory computer-readable media can include volatile and nonvolatile, removable and non-removable tangible, physical media implemented in technology for storage of information, such as computer readable instructions, data structures, program modules, or other data. The memory 702, removable storage 718, and non-removable storage 720 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information, and which can be accessed by the servers 700. Any such non-transitory computer-readable media can be part of the servers 700 or can be a separate database, databank, remote server, or cloud-based server.

In some implementations, the transceiver(s) 722 include any sort of transceivers known in the art. In some examples, the transceiver(s) 722 can include wireless modem(s) to facilitate wireless connectivity with the UEs 110, the Internet, and/or an intranet via a cellular connection. Further, the transceiver(s) 722 can include a radio transceiver that performs the function of transmitting and receiving radio frequency communications via an antenna (e.g., Wi-Fi or Bluetooth®). In other examples, the transceiver(s) 722 can include wired communication components, such as a wired modem or Ethernet port, for communicating with the other UEs or the provider's Internet-based network. The transceiver(s) 722, for example, on the car server 700A can receive requests for device information and/or the unique identifier, and send the device information and/or the unique identifier to the UEs 110 and/or the service provider 130, among other things.

In some implementations, the output device(s) 724 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the server 700 is connected to a network, the type of data being received (e.g., a match vs. a request for service listings), when SIM-OTA messages are being transmitted, etc. Output device(s) 724 also include ports for one or more peripheral devices, such as headphones, peripheral speakers, or a peripheral display.

In various implementations, input device(s) 726 include any sort of input devices known in the art. For example, the input device(s) 726 can include a camera, a microphone, a keyboard/keypad, or a touch-sensitive display. A keyboard/keypad can be a standard push button alphanumeric, multi-key keyboard (such as a conventional QWERTY keyboard), virtual controls on a touchscreen, or one or more other types of keys or buttons, and can also include a joystick, wheel, and/or designated navigation buttons, or the like.

While several possible examples are disclosed above, examples of the present disclosure are not so limited. While the system 100 and methods 200, 300, 400, 500 above are discussed with reference to use with cellular communications, for instance, the system 100 and methods 200, 300, 400, 500 can be used to provide dynamic provisioning for other types of wired and wireless communications. In addition, while various functions are discussed as being performed on the UEs 110, by the service provider 130, or by the car 120, other components could perform the same or similar functions without departing from the spirit of the invention.

The specific configurations, machines, and the size and shape of various elements can be varied according to particular design specifications or constraints requiring a UE 110, system 100, or method 200, 300, 400, 500 constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method for virtual subscriber identity module (SIM) sharing comprising:
   transmitting, with a transceiver of a first device, a request to a service provider to share a service with a second device, the request including service details and at least one of first device information, second device information, customer information, or the service;
   receiving, at the transceiver of the first device, a SIM over-the-air (SIM-OTA) message from the service provider;
   programming, with a processor of the first device, the first device using the SIM-OTA message to enable the first device to receive the service from the service provider according to the service details;
   transmitting, with the transceiver, a confirmation message to the service provider indicating successful provisioning of the first device;
   receiving, at the transceiver, a unique identifier from the service provider; and
   transmitting, with the transceiver, the unique identifier to the second device;
   determining, with the processor, that the first device lacks the service;
   generating, with the processor, a virtual SIM using at least a portion of data from the SIM-OTA message;
   assigning, with the processor, an antenna to be used in association with the virtual SIM; and
   associating, with the processor, the service with the virtual SIM.

2. The method of claim 1, wherein the request includes service details; and
   wherein the service details include instructions that determine:
      a first time period during which the first device receives the service; and
      a second time period during which the second device receives the service; and
   wherein the first time period and the second time period are different time periods.

3. The method of claim 2, wherein the first device is a user equipment (UE); and
   wherein the second device is a vehicle.

4. The method of claim 1, further comprising:
   establishing, with the transceiver, a near field communication (NFC) session between the first device and the second device; and
   receiving, via the transceiver, the second device information via the NFC session.

5. The method of claim 1, wherein the request further includes master device information indicating that only the first device has permission to change the service details.

6. The method of claim 5, further comprising:
   transmitting, with the transceiver, an override request to the service provider including new service details.

7. The method of claim 6, further comprising:
   receiving, by the processor, an override confirmation message from the service provider indicating that the service will be provided according to the new service details.

8. The method of claim 1, wherein the request includes first device information and second device information;
   wherein the first device information comprises at least one of a serial number for the first device or SIM data; and
   wherein the second device information comprises at least one of a serial number for the second device or SIM data.

9. The method of claim 1, wherein the request includes customer information; and
   wherein the customer information comprises at least one of a first name and a last name, a social security number, or a mailing address.

10. The method of claim 1, wherein the request includes a first set of service details; and
    wherein programming the first device using the SIM-OTA message comprises programming a first virtual SIM, the method further comprising:
    transmitting, with the transceiver, a second request to the service provider to change at least one service detail in the first set of service details;
    receiving, at the transceiver, a second SIM-OTA message from the service provider; and
    reprogramming, with the processor, the first virtual SIM using the second SIM-OTA message.

11. The method of claim 1, wherein the request includes a first set of service details; and
    wherein programming the first device using the SIM-OTA message comprises programming a first virtual SIM, the method further comprising:
    transmitting, with the transceiver, a second request to the service provider to change at least one service detail in the first set of service details;
    receiving, at the transceiver, a second SIM-OTA message from the service provider;
    deleting, with the processor, the first virtual SIM; and
    programming, with the processor, a second virtual SIM using the second SIM-OTA message.

12. The method of claim 1, wherein the request includes service details; and
    wherein the service details include a data limit for the second device.

13. A method for virtual subscriber identity module (SIM) sharing comprising:
    transmitting, with a transceiver of a first device, a request to a service provider to share a service with a second device, the request including service details and at least one of first device information, second device information, customer information, or the service;
    receiving, at the transceiver of the first device, a SIM over-the-air (SIM-OTA) message from the service provider;
    programming, with a processor of the first device, the first device using the SIM-OTA message to enable the first device to receive the service from the service provider according to the service details;
    transmitting, with the transceiver, a confirmation message to the service provider indicating successful provisioning of the first device;
    receiving, at the transceiver, a unique identifier from the service provider; and
    transmitting, with the transceiver, the unique identifier to the second device;
    determining, with the processor, that the service is an existing service on a first virtual SIM;
    generating, with the processor, a second virtual SIM using at least a portion of data from the SIM-OTA message;
    removing, with the processor, the service from the first virtual SIM;
    assigning, with the processor, an antenna to be used in association with the second virtual SIM; and
    associating the service with the second virtual SIM.

14. The method of claim 13, wherein the request includes service details; and
   wherein the service details include instructions used to determine:
      a first time period during which the first device receives the service; and
      a second time period during which the second device receives the service; and
   wherein the first time period and the second time period are different time periods.

15. The method of claim 14, wherein the first device is a user equipment (UE); and
   wherein the second device is a vehicle.

16. The method of claim 14, wherein the request includes service details; and
   wherein the service details include a data limit for the first device, the second device, or both.

17. The method of claim 13, wherein the request further includes master device information indicating that only the first device has permission to share the service.

18. The method of claim 13, wherein the request includes first device information and second device information;
   wherein the first device information comprises at least one of a serial number for the first device or SIM data; and
   wherein the second device information comprises at least one of a serial number for the second device or SIM data.

19. The method of claim 13, wherein the request includes customer information; and
   wherein the customer information comprises at least one of a first name and a last name, a social security number, or a mailing address.

* * * * *